(12) United States Patent
Sivavakeesar

(10) Patent No.: US 11,317,273 B2
(45) Date of Patent: Apr. 26, 2022

(54) COMMUNICATION SYSTEM FOR ESTABLISHING A CONNECTION WITH A MOBILITY MANAGEMENT ENTITY

(71) Applicant: NEC Corporation, Tokyo (JP)

(72) Inventor: Sivapathalingham Sivavakeesar, Milton Keynes (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/748,263

(22) PCT Filed: Aug. 10, 2016

(86) PCT No.: PCT/JP2016/003707
§ 371 (c)(1),
(2) Date: Jan. 29, 2018

(87) PCT Pub. No.: WO2017/029795
PCT Pub. Date: Feb. 23, 2017

(65) Prior Publication Data
US 2018/0220290 A1    Aug. 2, 2018

(30) Foreign Application Priority Data

Aug. 14, 2015   (GB) ...................................... 1514540

(51) Int. Cl.
*H04W 8/06*     (2009.01)
*H04W 88/14*    (2009.01)
*H04W 76/10*    (2018.01)
*H04W 8/08*     (2009.01)
(Continued)

(52) U.S. Cl.
CPC ............. *H04W 8/065* (2013.01); *H04W 8/08* (2013.01); *H04W 8/18* (2013.01);
(Continued)

(58) Field of Classification Search
None
See application file for complete search history.

(56) References Cited

U.S. PATENT DOCUMENTS

2004/0157602 A1* 8/2004 Khawand .............. H04W 28/24
455/434
2010/0039979 A1* 2/2010 Takase .................. H04L 12/185
370/312
(Continued)

FOREIGN PATENT DOCUMENTS

EP      2 747 376 A1    6/2014
EP      2 996 393 A1    3/2016
(Continued)

OTHER PUBLICATIONS

Notification of Reasons for Refusal dated Mar. 5, 2019 from the Japanese Patent Office in application Machine No. 2018-507665.
(Continued)

*Primary Examiner* — Anh Ngoc M Nguyen
(74) *Attorney, Agent, or Firm* — Sughrue Mion, PLLC

(57) ABSTRACT

A system is described in which a default mobility management entity (MME) receives, from a base station, a request for setting up a communication connection to a mobile device having an associated usage type. The default MME sends, to the base station and responsive to the request, a message identifying a dedicated MME, to which the request should be re-routed, the dedicated MME having a supported service type corresponding to the usage type associated with the mobile device. The base station sends a response to the default MME, the response indicating whether re-routing to said dedicated MME is was successful or not (e.g. due to an overload of the dedicated MME). If the re-routing was not successful, the default MME attempts to serve the mobile device instead of the dedicated MME.

3 Claims, 9 Drawing Sheets

(51) Int. Cl.
*H04W 8/18* (2009.01)
*H04W 28/02* (2009.01)

(52) U.S. Cl.
CPC ....... *H04W 28/0215* (2013.01); *H04W 76/10* (2018.02); *H04W 88/14* (2013.01)

(56) References Cited

U.S. PATENT DOCUMENTS

| | | | |
|---|---|---|---|
| 2010/0080186 A1 | 4/2010 | Guo et al. | |
| 2012/0302230 A1 | 11/2012 | Lim et al. | |
| 2013/0279330 A1* | 10/2013 | Feng | H04W 28/0247 370/230 |
| 2014/0169269 A1* | 6/2014 | Salot | H04L 47/2408 370/328 |
| 2014/0248862 A1 | 9/2014 | Raleigh et al. | |
| 2015/0085658 A1* | 3/2015 | Hong | H04W 4/90 370/235 |
| 2015/0208324 A1* | 7/2015 | McCann | H04W 48/10 370/338 |
| 2016/0112943 A1* | 4/2016 | Horn | H04W 48/20 370/329 |
| 2016/0174120 A1 | 6/2016 | Zembutsu et al. | |
| 2016/0227457 A1 | 8/2016 | Tanaka et al. | |
| 2018/0146503 A1* | 5/2018 | Castro Castro | H04W 76/18 |

FOREIGN PATENT DOCUMENTS

| | | |
|---|---|---|
| WO | 2012/065010 A1 | 5/2012 |
| WO | 2014003436 A1 | 1/2014 |
| WO | 2015/003753 A1 | 1/2015 |
| WO | 2015/037650 A1 | 3/2015 |
| WO | 2015/133078 A1 | 9/2015 |

OTHER PUBLICATIONS

3GPP TR 23.707, V13.0.0 (Dec. 2014), Technical Report, "3rd Generation Partnership Project; Technical Specification Group Services and System Aspects; Architecture Enhancements for Dedicated Core Networks; Stage 2 (Release 13)", Dec. 2014, pp. 1-39.

3GPP SA WG2 Meeting #109, S2-152107, "Introduce the Dedicated Core Network (DECOR) feature", NTT DOCOMO, Huawei, Ericsson, NEC, Samsung, TeliaSonera, AT&TMay 25-29, 2015, 20 pages.

3GPP TS 23.401, V.13.2.0 (Mar. 2015), Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 13)", Mar. 2015, pp. 1-313.

3GPP TSG RAN Meeting #68, RP-151048 (Revision of RP-151007), "Work Item on Dedicated Core Networks," NTT DOCOMO, Inc., Ericsson, Jun. 15-18, 2015, 14 pages.

3GPP Draft; SA WG2 Meeting #108, S2-150795, "Infinite loop in rerouting to dedicated networks," NEC, Apr. 13-17, 2015, pp. 1-2.

3GPP Draft, SA WG2 Meeting #106, S2-144647 (revision of S2-144503 and S2-144084), "Updates to Solution-1," NTT DOCOMO, Nov. 17-21, 2014, pp. 1-7.

Written Opinion of the International Searching Authority of PCT/JP2016/003707 dated Nov. 7, 2016.

International Search Report of PCT/JP2016/003707 dated Nov. 7, 2016.

Japanese Office Action for JP Application No. 2020-104280 dated Jul. 6, 2021 with English Translation.

3GPP TSG-RAN, "Non-Access-Stratum(NAS) protocol for Evolved Packet system(EPS)", Stage 3(Release 13), 3GPP TS 24.301 V13. 2.0 (Jun. 2015), pp. 1-386.

Chinese Office Communication for CN Application No. 201680047471.6 dated Nov. 9, 2021 with English Translation.

Ericsson, "UE and CN Synchronization in Dedicated Core Networks", 3GPP SA WG2 Meeting #107, S2-150078, Jan. 20, 2015, Italy, p. 1-4.

Ericsson, "Using Cancel Location with Reattach at UE Usage Type updates", 3GPP SA WG2 Meeting #S2#106, S2-144648, Nov. 21, 2014, USA, p. 1-2

Samsung, "NNSF and initial UE message population". 3GPP TSG-SA WG2 Meeting #108, S2-151079, Apr. 7, 2015, Mexico.

Ma shuhui et al., "Research of Coexistence Strategies for M2M and H2H Services", Broad Angle for Technology, Feb. 15, 2013.

* cited by examiner

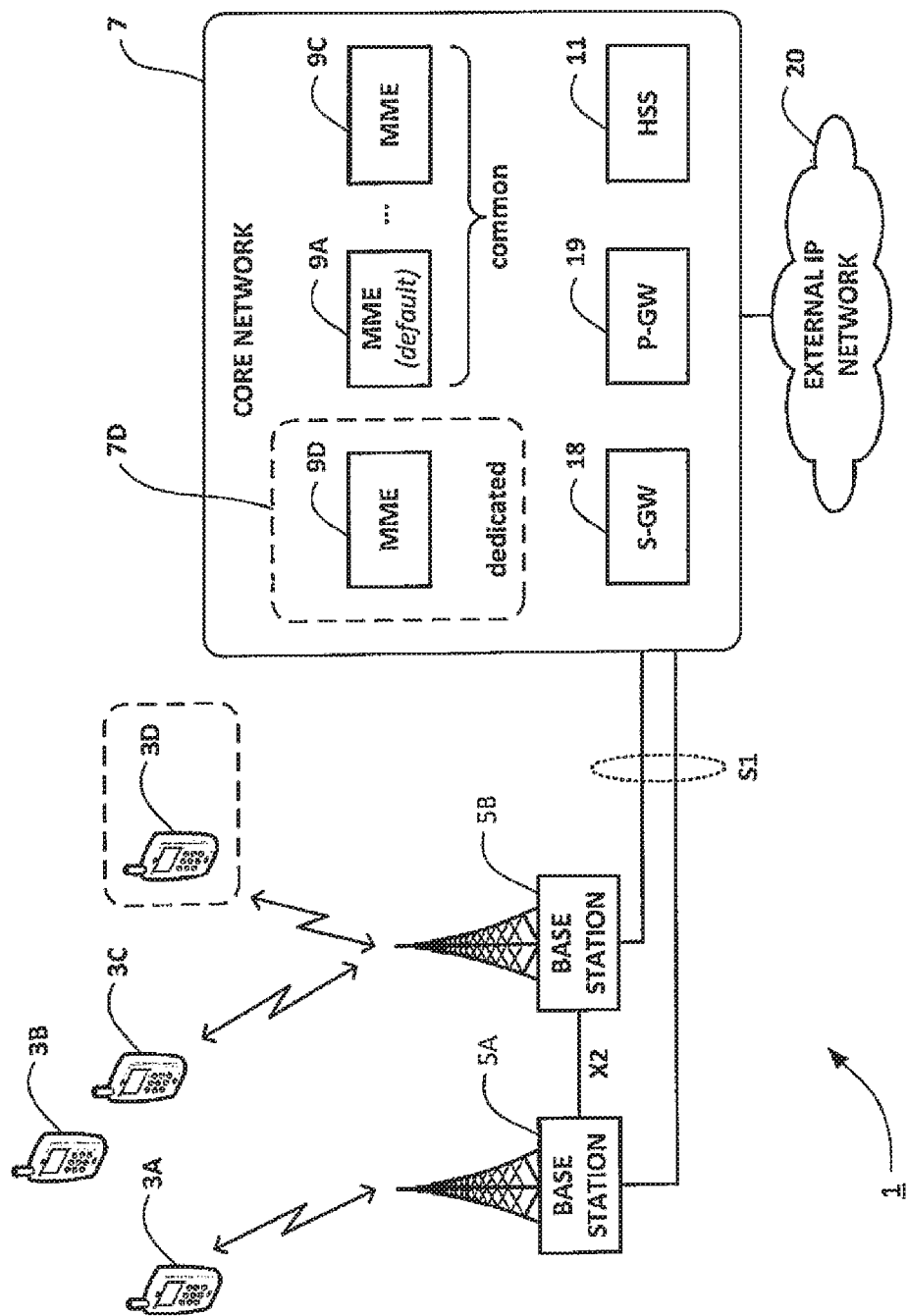
[Fig. 1]

[Fig. 2]
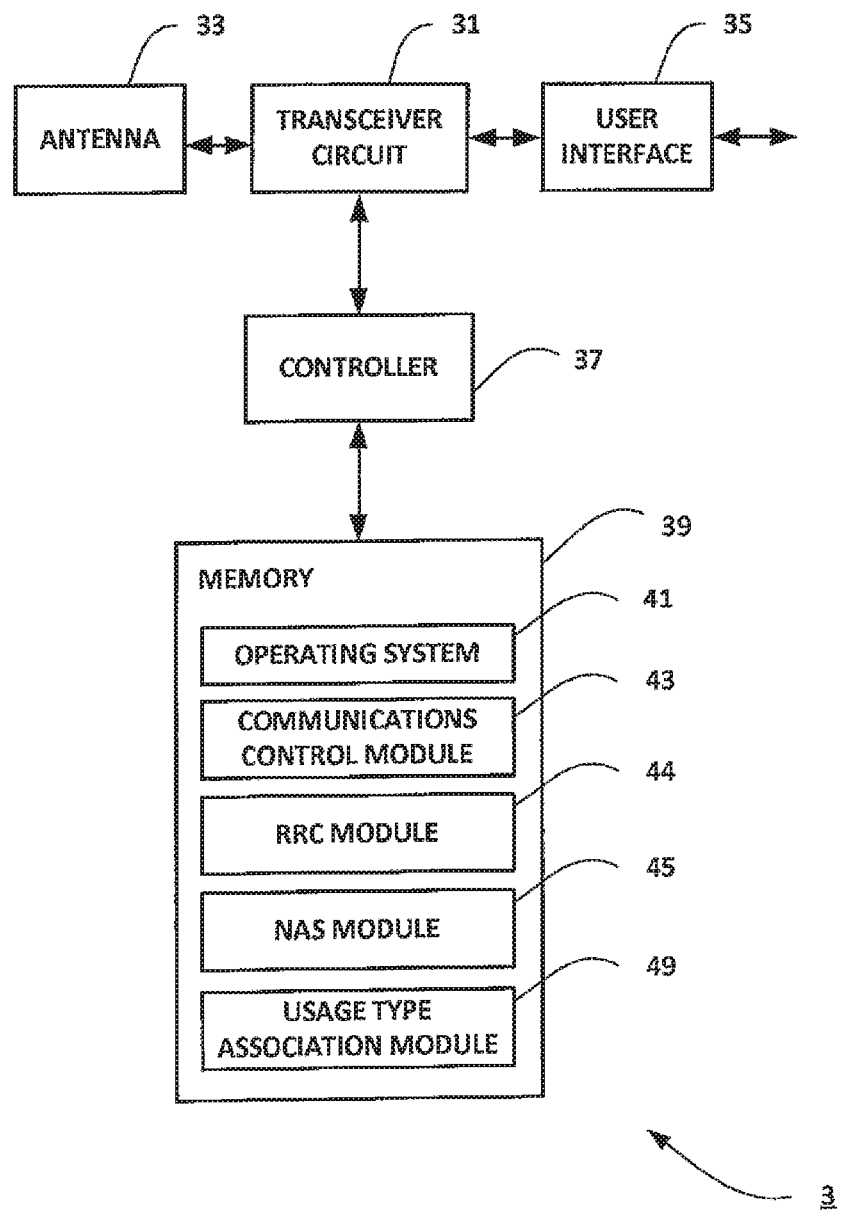

[Fig. 3]
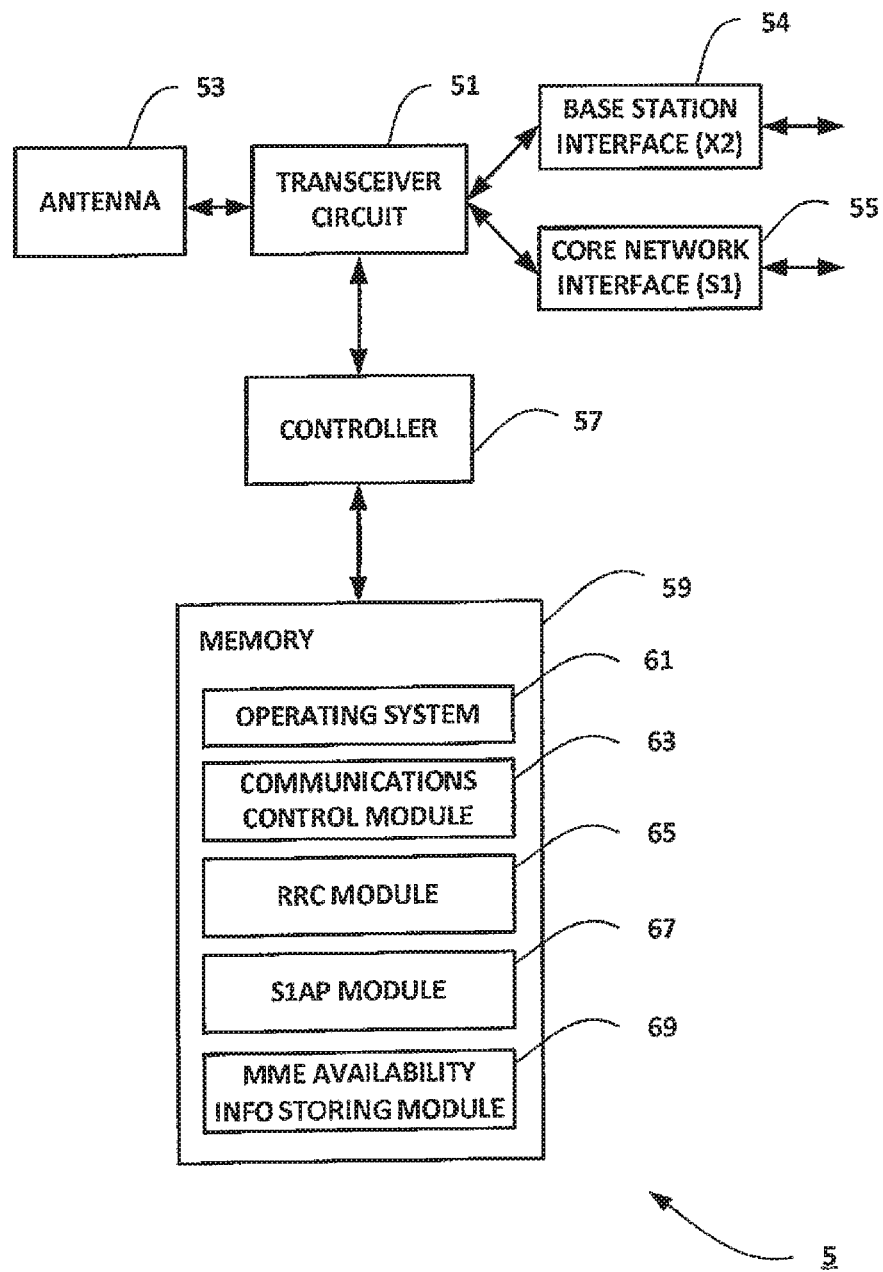

[Fig. 4]
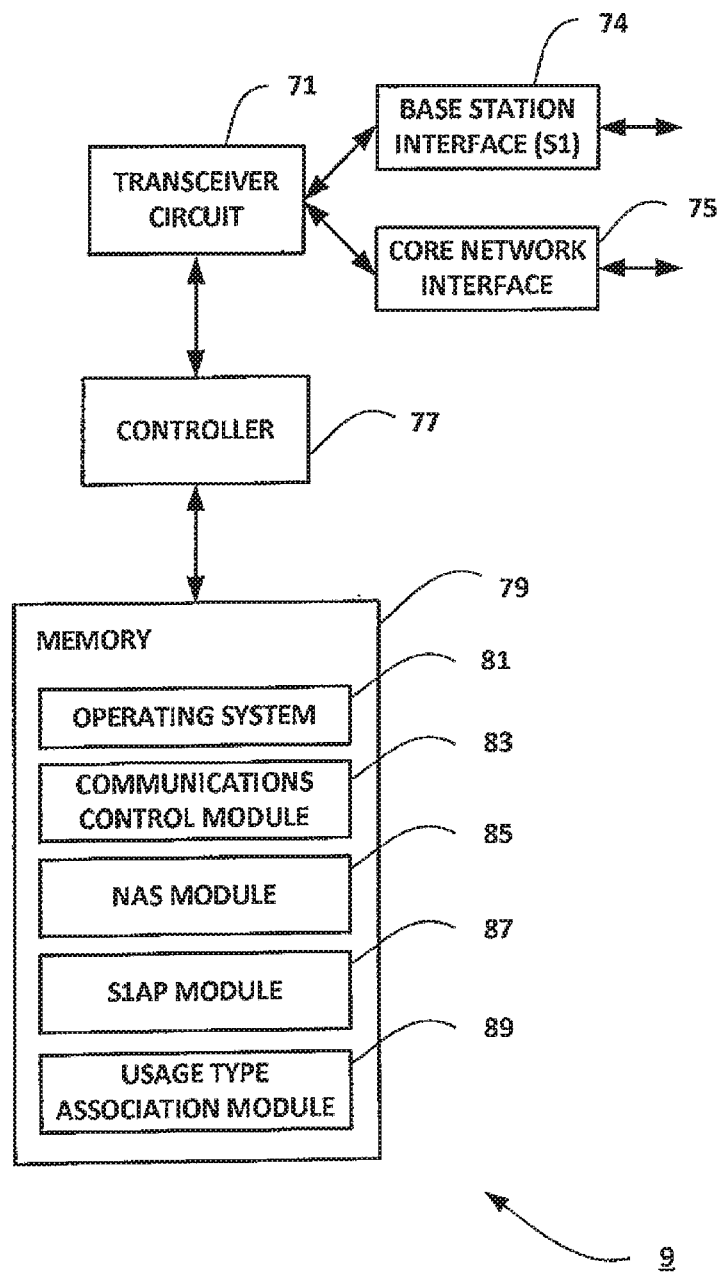

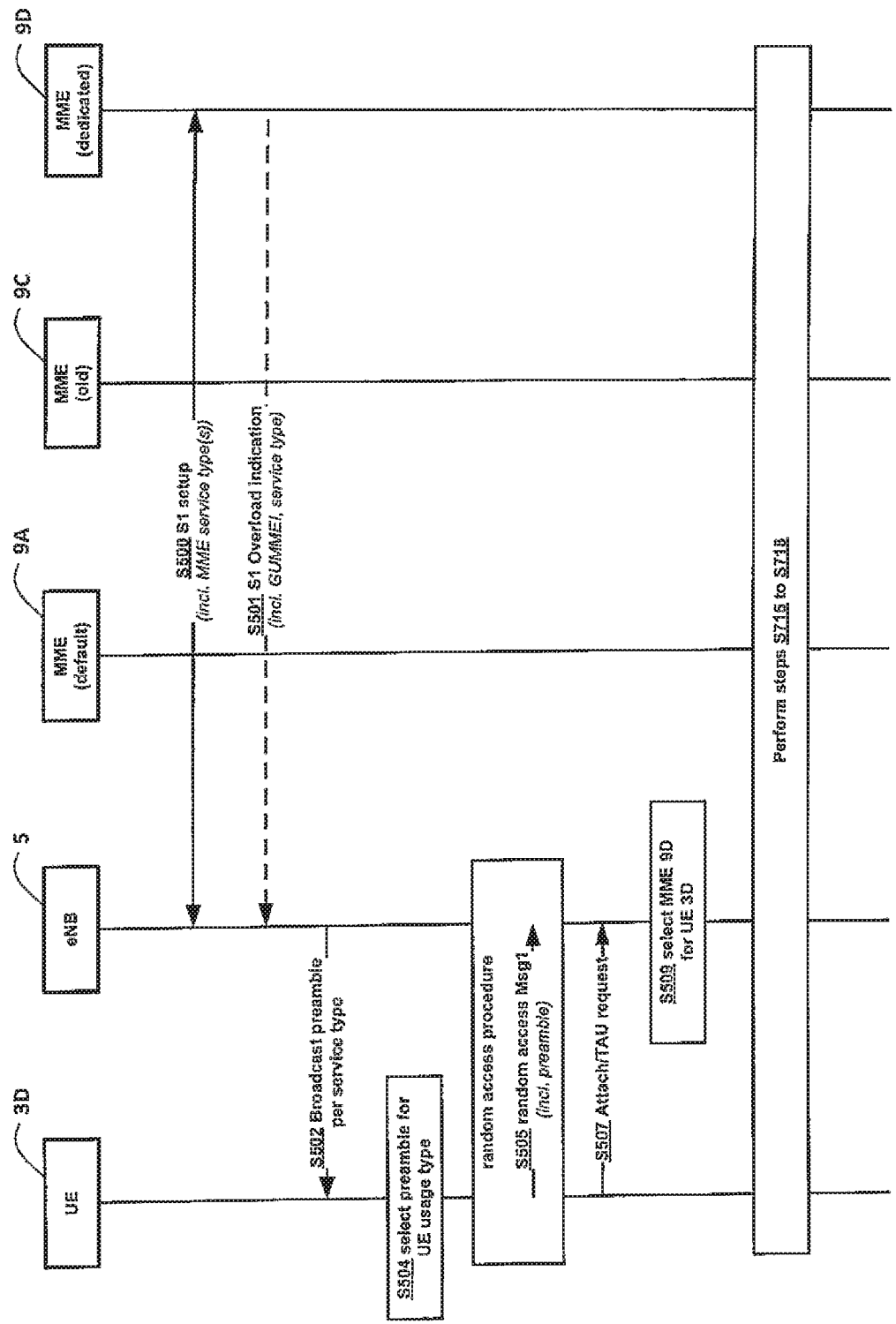
[Fig. 5]

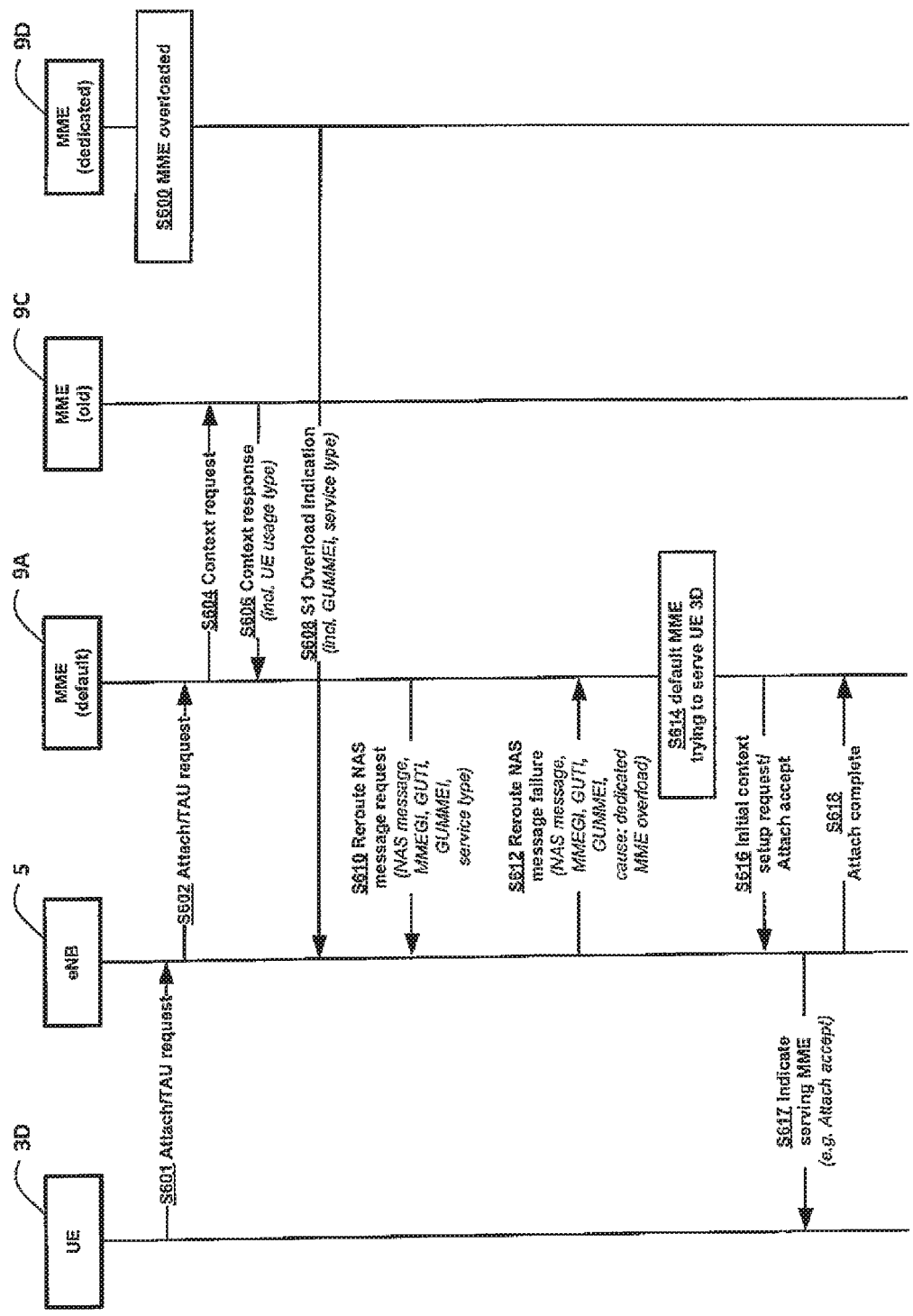
[Fig. 6]

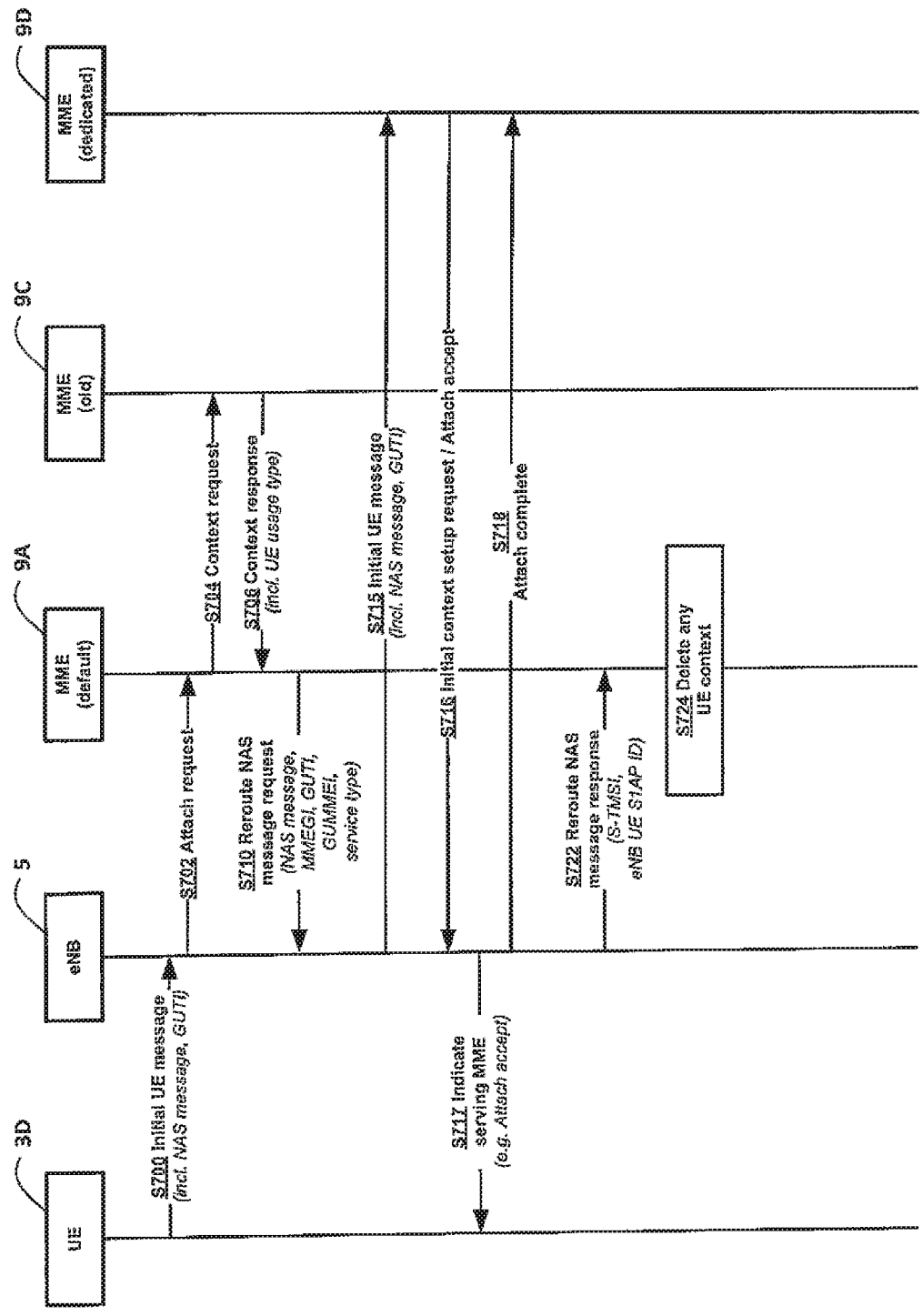
[Fig. 7]

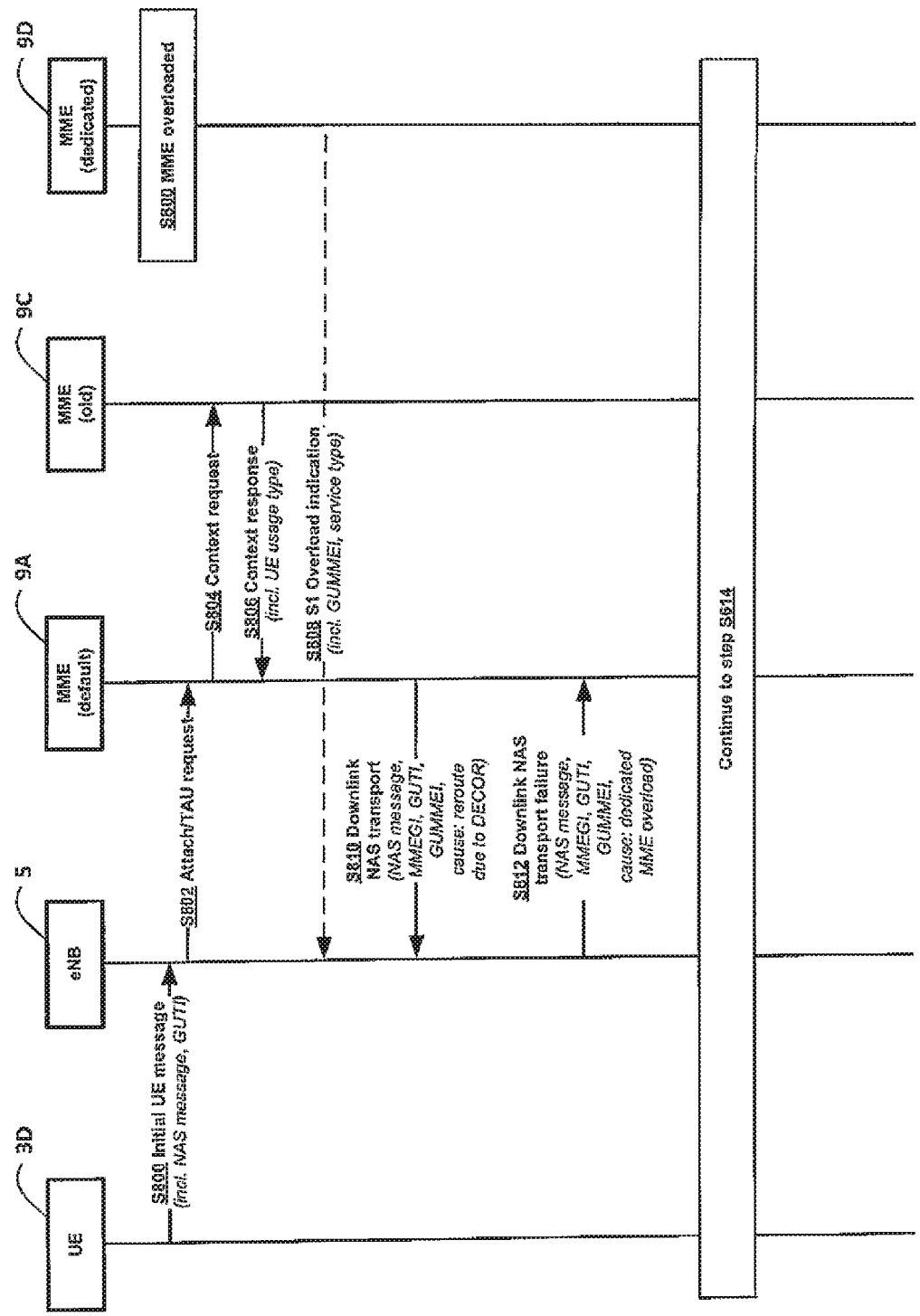
[Fig. 8]

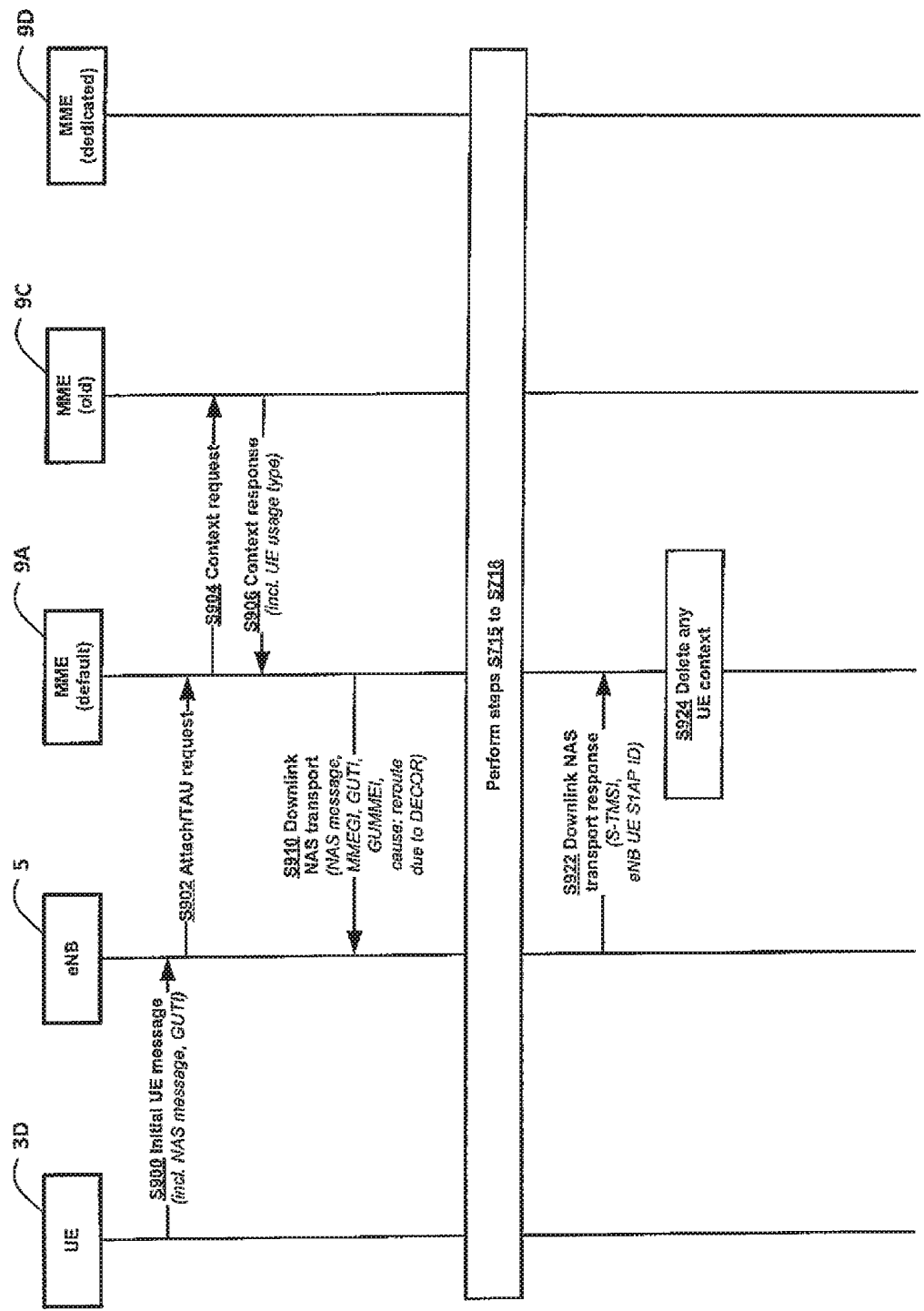
[Fig. 9]

COMMUNICATION SYSTEM FOR ESTABLISHING A CONNECTION WITH A MOBILITY MANAGEMENT ENTITY

CROSS REFERENCE TO RELATED APPLICATIONS

This application is a National Stage of International Application No. PCT/JP2016/003707 filed Aug. 10, 2016, claiming priority based on British Patent Application No. 1514540.2 filed Aug. 14, 2015, the contents of all of which are incorporated herein by reference in their entirety.

TECHNICAL FIELD

The present invention relates to a communication system. The invention has particular but not exclusive relevance to wireless communication systems and devices thereof operating according to the 3rd Generation Partnership Project (3GPP) standards or equivalents or derivatives thereof, such as the Universal Terrestrial Radio Access Network (UTRAN) and the Long Term Evolution (LTE) of UTRAN (E-UTRAN), including LTE-Advanced. The invention has particular although not exclusive relevance to using a dedicated core network.

Background Art

Under the 3GPP standards, a 'NodeB' (or an 'eNB' in LTE) is the base station via which mobile devices connect to a core network and communicate to other mobile devices or remote servers. In order to be able to do so, the mobile devices establish a so called radio resource control (RRC) connection with a serving base station. For simplicity, the present application will use the term base station to refer to any such base stations. Communication devices might be, for example, mobile communication devices such as mobile telephones, smartphones, user equipment, personal digital assistants, laptop computers, web browsers, and the like. 3GPP standards also make it possible to connect non-mobile user equipment to the network, such as Wi-Fi routers, modems, which can be implemented as a part of a (generally) stationary apparatus. For simplicity, the present application refers to mobile communication devices (or mobile devices) in the description but it will be appreciated that the technology described can be implemented on any mobile and "non-mobile" equipment that can connect to such a core network.

Under the 3GPP standards, base stations are coupled to a core network (referred to as an enhanced packet core (EPC) network in LTE). In order to keep track of the mobile devices and to facilitate movement between the different base stations, the core network comprises a number of mobility management entities (MMEs) which are in communication with the base stations coupled to the core network. Communication between the mobile devices and their associated MME is carried out using non-access stratum (NAS) signalling (via the serving base station). In some core networks, a serving GPRS support node (SGSN) may also be used instead of an MME, depending on the radio access technology (RAT) used by the mobile device.

The latest developments of the 3GPP standards are referred to as the Long Term Evolution (LTE) of EPC network and E-UTRA (Evolved UMTS Terrestrial Radio Access) network. LTE (and more recently LTE-Advanced, or 'LTE-A') makes it possible for User Equipment (UE), such as mobile devices to connect efficiently to the core network using dedicated core network nodes (such as dedicated MMEs). Details of this so-called 'Dedicated Core Network' (DECOR) feature have been discussed in 3GPP technical report (TR) 23.707 (V13.0.0) and 3GPP document no. S2-152107, the latter of which relates to version 13.2.0 of the 3GPP technical specification (TS) no. 23.401.

In summary, the DECOR feature enables a network operator to deploy multiple dedicated core networks (DCNs) within its network (along with a common (i.e. non-dedicated) core network). Each DCN may be dedicated to serve specific type(s) of subscribers and/or specific type(s) of services. DCNs are optional and can be deployed, selectively, for various types of radio access technologies (RATs), such as GERAN (GSM EDGE Radio Access Network), UTRAN, and/or E-UTRAN. For example, a network operator may deploy dedicated MMEs (in order to support E-UTRAN) but no dedicated SGSNs (thus without supporting GERAN/UTRAN), or vice versa. The motivations for deploying DECOR might include, amongst others, the provision of DCNs with specific characteristics/functions or scaling, to isolate specific UEs or subscribers (e.g. machine-to-machine (M2M) subscribers, subscribers belonging to a specific enterprise or a separate administrative domain, subscribers belonging to a mobile virtual network operator (MVNO), etc.) from other UEs or subscribers, etc.

However, such different groups of customers and devices may have different requirements in terms of features, traffic characteristics, availability, congestion management, signalling and user plane data usage, and/or the like. DCNs comprising dedicated/specialised core network elements/resources can help operators meet the requirements of such groups of devices/customers. DCNs may also contribute to meeting network availability and/or redundancy requirements, and facilitates independent scaling or specific feature provisioning for specific user or traffic types and isolating various types of users and traffic from each other.

Each DCN comprises of one or more MME/SGSN and it may comprise one or more serving gateway (S-GW), packet data network (PDN) gateway (P-GW), and/or policy and charging rules function (PCRF), as appropriate. Each subscriber can be allocated to and served by a DCN based on their respective subscription information ("UE Usage Type"). Networks deploying DCNs may have a default DCN (or default core network nodes of a common core network) for managing UEs for which a DCN is not available and/or if sufficient information (e.g. an associated UE Usage Type) is not available in order to assign a UE to a particular DCN. One or more DCNs may be deployed together with a default DCN (or default core network nodes) that all share the same RAN.

There is one UE Usage Type per subscriber, which requires no specific UE functionality, i.e. it works also with UEs conforming to earlier standard releases. Like in the case conventional MMEs, it is possible to move UE context from one (source) MMESGSN to another (target) MME/SGSN, for example, during handover, load balancing, initial network attachment, and/or the like. When an MME/SGSN supporting DCNs selects a target MME/SGSN for a UE, the selection of the target MME/SGSN is restricted to the same DCN (due to the UE usage type).

3GPP work item (WI) document no. RP-151048 discusses the so-called NAS node selection function (NNSF) and signalling support for MME/SGSN (re)selection functionality for DECOR. Further, S2-152107 describes a possible NAS message redirection procedure, in which a NAS message is redirected from one MME/SGSN (e.g. a default MME/SGSN) to a dedicated MME/SGSN based on UE usage type. This may be necessary, for example, upon the UE first attempting to connect to the core network and establishing a connection with a default MME in the core network (selected by the UE's serving base station for the UE) that does not support the UE usage type associated with this UE. Therefore, NAS message redirection is initiated by the UE's currently selected (e.g. default) serving MME/SGSN by sending, to the UE's serving base station, a request to reroute the UE's NAS message to the dedicated MME/SGSN. The request includes a parameter (e.g. an identifier of an MME group) which corresponds to a DCN that is assigned to that UE usage type. When the serving base station receives the request to reroute the UE's NAS message to the dedicated MME/SGSN, it performs a NNSF procedure for selecting a suitable dedicated MME/SGSN corresponding to the received parameter, and forwards the NAS message (for example, the so-called 'Initial UE message') to the selected dedicated MME/SGSN. This establishes the dedicated MME/SGSN as the new serving MME/SGSN for the UE.

Such NAS message redirection (and/or MME/SGSN reselection) might also be needed for load balancing purposes (e.g. for moving subscribers from an MME/SGSN having an overload or an MME/SGSN having a relatively high load to another MME(s)/SGSN(s) having a relatively low load).

SUMMARY OF INVENTION

Technical Problem

However, the inventors have realised that the present procedures for MME/SGSN (re)selection and/or NAS message rerouting for DECOR functionality are inefficient and may result in unnecessary signalling and/or creating/maintaining UE context in the wrong MME/SGSN at the wrong time.

Accordingly, preferred embodiments of the present invention aim to provide methods and apparatus which overcome or at least partially alleviate at least some of the above issues.

Although for efficiency of understanding for those of skill in the art, the invention will be described in detail in the context of a 3GPP system (UMTS, LTE), the principles of the invention can be applied to other systems in which mobile devices or User Equipment (UE) access the system using dedicated core network nodes.

Solution to Problem

In one aspect, the invention provides communication apparatus for providing communication access to a communication network, the communication apparatus comprising: a controller adapted to control communications of at least one communication device located within an associated communication cell, via said communication apparatus; and a transceiver operable to communicate with said at least one communication device within said associated communication cell and to communicate with a plurality of mobility management entities (MMEs); wherein said transceiver is operable: to receive, from a communication device having an associated usage type, signalling for establishing a communication connection via said communication apparatus; to send signalling for setting up said communication connection to a default MME; to receive, responsive to said signalling for setting up said communication connection, from said default MME, a message identifying a dedicated MME, to which said signalling for setting up said communication connection should be re-routed, said dedicated MME having at least one supported service type corresponding to the usage type associated with the communication device that sent said signalling for establishing a communication connection; wherein said controller is operable to determine whether or not said dedicated MME is suitable for serving said communication device that sent said signalling for establishing a communication connection; wherein said transceiver is operable to send a response to said default MME, based on said determination of whether or not said dedicated MME is suitable for serving said communication device, indicating one of the following: (a) re-routing to said dedicated MME is unsuccessful; and (b) re-routing to said dedicated MME is successful.

In one aspect, the invention provides communication apparatus for providing communication access to a communication network, the communication apparatus comprising: a controller adapted to control communications of at least one communication device located within an associated communication cell, via said communication apparatus; and a transceiver operable to communicate with said at least one communication device within said associated communication cell and to communicate with at least one mobility management entity (MME); wherein said at least one MME has at least one supported service type and is dedicated to serving communication devices having a usage type corresponding to said at least one supported service type; and wherein said transceiver is operable to receive, for each said at least one MME, respective information identifying a group associated with that MME and respective information identifying said at least one supported service type of that MME.

In one aspect, the invention provides a communication device comprising: a memory configured to hold information identifying a usage type associated with said communication device; a controller adapted to control communications of said communication device with communication apparatus operating a cell; and a transceiver operable to send, to said communication apparatus, signalling for establishing a communication connection with a mobility management entity (MME), wherein said signalling for establishing a communication connection comprises information identifying said usage type associated with said communication device.

In one aspect, the invention provides a mobility management entity (MME) for a communication network, the MME being configured to operate as a default MME and comprising: a transceiver operable to communicate with communication apparatus operating a communication cell and to communicate with at least one communication device within said communication cell; wherein said transceiver is operable: to receive, from said communication apparatus, signalling for setting up a communication connection to a communication device having an associated usage type; to send, responsive to said signalling for setting up said communication connection, to said communication apparatus, a message identifying a dedicated MME, to which said signalling for setting up said communication connection should be re-routed, said dedicated MME having at least one supported service type corresponding to the usage type associated with the communication device that sent signalling for establishing a communication connection; and receive a response, from said communication apparatus, indicating one of the following: (a) re-routing to said dedicated MME is unsuccessful; and (b) re-routing to said dedicated MME is successful.

In one aspect, the invention provides a mobility management entity (MME) for a communication network, the MME being configured to operate as a dedicated MME and comprising: a transceiver operable to communicate with communication apparatus operating a communication cell and to communicate with at least one communication device within said communication cell; a controller operable to obtain information identifying at least one supported service type that the MME is configured to support for communication devices having a usage type corresponding to said at least one supported service type; and wherein said transceiver is operable to send, to said communication apparatus, information identifying a group associated with the MME and information identifying at least one service type supported by the MME. Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Exemplary embodiments of the invention will now be described, by way of example, with reference to the accompanying drawings in which:

BRIEF DESCRIPTION OF DRAWINGS

FIG. 1 illustrates schematically a cellular telecommunication system to which exemplary embodiments of the invention may be applied;

FIG. 2 is a block diagram of a mobile device forming part of the system shown in FIG. 1;

FIG. 3 is a block diagram of a base station forming part of the system shown in FIG. 1:

FIG. 4 is a block diagram of a mobility management entity forming part of the system shown in FIG. 1;

FIG. 5 is a timing diagram indicating an exemplary procedure for implementing a first exemplary embodiment of the present invention:

FIG. 6 is a timing diagram indicating an exemplary procedure for implementing a second exemplary embodiment of the present invention;

FIG. 7 is a timing diagram indicating another exemplary procedure for implementing the second exemplary embodiment of the present invention;

FIG. 8 is a timing diagram indicating an exemplary procedure for implementing a third exemplary embodiment of the present invention; and FIG. 9 is a timing diagram indicating another exemplary procedure for implementing the third exemplary embodiment of the present invention.

DESCRIPTION OF EMBODIMENTS

Overview

FIG. 1 schematically illustrates a mobile (cellular) telecommunication network 1 in which users of mobile devices 3A to 3D can communicate with each other and other users via E-UTRAN base stations 5A, 5B and a core network 7 using an E-UTRA radio access technology (RAT). As those skilled in the art will appreciate, whilst four mobile devices 3 and two base stations 5 are shown in FIG. 1 for illustration purposes, the system, when implemented, will typically include other base stations and mobile devices.

As is well known, a mobile device 3 may enter and leave the areas (i.e. radio cells) served by the base stations 5 as the mobile device 3 is moving around in the geographical area covered by the telecommunication system 1. In order to keep track of the mobile device 3 and to facilitate movement between the different base stations 5, the core network 7 comprises a number of mobility management entities (MMEs) 9A to 9D, of which MMEs 9A to 9C are common MMEs (i.e. not associated with any specific UE Usage Type or associated with all UE Usage Types) and MME 9D is a dedicated MME (i.e. it is associated with one or more specific UE Usage Type(s)). Therefore, as shown, MME 9D forms part of a DCN 7D whilst the other MMEs 9A to 9C form part of the main (or common) core network 7. Moreover, MME 9A is configured to act as a default MME for the mobile devices 3 (e.g. when first connecting to the core network 7 and/or when other MMEs are unavailable). The provision of such a default MME thus helps reducing the risk of service disruption.

The MMEs 9 are in communication with the base stations 5 coupled to the core network 7. The core network 7 also comprises an HSS 11, and one or more gateways, such as a serving gateway (S-GW) 18 and/or a packet data network gateway (P-GW) 19.

The mobile devices 3 and their respective serving base stations 5 are connected via an LTE air interface, the so-called "Uu" interface. The base stations 5 are connected to each other via a so-called "X2" interface. Each base station 5 is also connected to the core network 7 nodes (i.e. the MME 9 and the S-GW 18) via a so-called "S1" interface. From the core network 7, connection to an external IP network 20, such as the Internet, is also provided via the P-GW 19. Although not shown in FIG. 1, the MME 9 is also connected to the HSS 11 and the gateway 18, 19 via respective 3GPP interfaces.

For each mobile device 3, the HSS 11 stores relevant subscription data, such as settings and subscription data required for the 3GPP subscriber to access the network 1, associated service type(s) and preferences, information identifying corresponding subscriber group(s), etc. Specifically, the HSS 11 stores for each subscriber (each mobile device 3) the subscription information parameter 'UE usage type' which can be used in the selection of an appropriate MME 9 for the subscriber. For each supported UE usage type, the network operator configures a set of (one or more) associated MMEs 9 (or DCNs). However, it will be appreciated that, if appropriate, each MME 9 (or DCN) may be associated with more than one UE usage types and/or a default MME 9 may be associated with UE usage types that do not have any dedicated MME 9D and/or dedicated core network 7D.

In this system, the subscription associated with the mobile device 3D has a UE usage type that corresponds to the UE usage type associated with the MME 9D. In other words, the MME 9D is a core network node that forms part of the mobile device's 3D dedicated core network 7D. Therefore, the core network 7 ensures that, whenever possible, the mobile device 3D is served by this dedicated core network 7D. In order to do so, the HSS 11 (or the mobile device's 3 previous MME 9) provides the UE usage type associated with the mobile device 3 to an MME 9 that has been (initially) selected by the base station 5 when the mobile device 3 first attempts to establish a connection with that selected MME 9.

Although not shown in FIG. 1, the dedicated MME 9D is configured to select an associated dedicated S-GW and P-GW for the mobile device 3D based on its UE Usage Type.

Beneficially, in this example, the base stations 5 are configured to obtain information about each connected MME's 9 supported service type(s) from the MME 9. For example, the base station 5B obtains this information during an initial setup procedure which configures the S1 connection between the base station 5B and the MME 9D and/or anytime later when the MME 9D is reconfigured, using suitable S1 signalling (such as an 'S1 setup response' message, an 'MME configuration update' message, and/or the like).

Furthermore, in this example, the base stations 5 are also configured to obtain information for each mobile device 3 served by them about the respective UE usage type associated with that particular mobile device 3. Beneficially, in this example, the base station 5B is configured to obtain this information either directly from the mobile device 3 (e.g. before performing any NNSF procedure for that particular mobile device 3) or explicitly from an MME 9A currently serving (or initially selected to serve) that particular mobile device 3 (e.g. from a 'UE Usage Type' information element in a 'Reroute NAS message request' message, a 'Downlink NAS transport' message, and/or the like). If the base station 5B obtains the UE usage type associated with the mobile device 3D directly from that mobile device 3D, then it may be obtained using implicit signalling (e.g. by determining which random access preamble is used by the mobile device 3D) or explicit signalling (e.g. using a low access priority indication procedure or similar).

The base stations 5, in this example, are also configured to obtain and store information about the availability of each connected MME 9 (e.g. information identifying that a particular MME is overloaded and/or information identifying the relative loads on each MME). This availability information for each MME 9 is typically obtained and stored in association with the information relating to any specific supported service type(s) (i.e. UE usage types) for that MME 9. Thus, using the information relating to the UE usage type, the MME supported service types, and the information regarding the availability of each connected MME 9 (if any), the base station 5B is able to select an appropriate dedicated MME (in this example, MME 9D, if available) for the mobile device 3D without unnecessary signalling. However, when a particular MME 9 is not available, e.g. due to an overload and/or the like, the base station 5B is able to select the default MME 9A (or an appropriate common MME 9C) to register the mobile device 3D even though the UE usage type for that mobile device 3D may be different to the supported UE usage type(s) associated with the selected MME 9A or 9C. In order to do so, the base station 5B also includes in its message to the MME 9A or 9C an indication that the associated dedicated MME 9D is (temporarily) overloaded/otherwise unavailable.

Even when the currently selected MME 9A or 9C attempts to reroute a NAS message from the mobile device 3D to the corresponding dedicated MME 9D, the base station 5B can beneficially respond to the requesting MME 9A or 9C that the dedicated MME 9D is (still) unavailable (e.g. due to an overload). In this case, the indication provided by the base station 5B advantageously prevents the requesting MME 9A or 9C from deleting any UE context held for the mobile device 3D thereby ensuring service continuity even though the mobile device 3D is currently registered to an inappropriate (i.e. non-dedicated) MME 9.

In order to facilitate the sending of such a response to an MME 9 that requests rerouting of a NAS message, the MME 9 making the rerouting request is beneficially adapted to use a message that solicits a response (e.g. a so called 'Class 1' message in LTE) rather than a message that is automatically deemed to be successful when it is sent (e.g. a so-called 'Class 2' message in LTE). Such a message that solicits a response may require a response regardless of whether or not the rerouting to another MME 9 is successful (e.g. a positive or negative response indication to indicate success or failure as appropriate). Such a message that solicits a response may, however, be a message that requires either a 'success' indication to indicate success and assumes failure after a predetermined time period expire; or a 'failure' indication to indicate failure and assumes success after a predetermined time period expires.

In summary, the base stations in this system are beneficially able to notify the MMEs about a dedicated MME being overloaded (or otherwise being unavailable). For example, when the serving base station indicates to a default MME that the dedicated MME is overloaded, the default MME may attempt to serve the mobile device irrespective of the associated UE usage type (rather than rejecting the mobile device). Moreover, any intermediate (e.g. default) MME that is initially selected by the base station is advantageously configured to keep the associated UE context upon attempting to reroute the mobile device's NAS message (even if it is inappropriate for the UE usage type associated with the mobile device) until it is certain that the mobile device's dedicated MME is available.

<Mobile Device>

FIG. 2 is a block diagram illustrating the main components of one of the mobile devices 3 shown in FIG. 1. As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily shown in FIG. 2, the mobile device 3 will of course have all the usual functionality of a conventional mobile device 3 (such as a user interface 35) and this may be provided by any one or any combination of hardware, software and firmware, as appropriate. Software may be pre-installed in the memory 39 and/or may be downloaded via the telecommunication network or from a removable data storage device (RMD), for example. The controller 37 controls overall operation of the mobile device 3 by, in this example, program instructions or software instructions stored within memory 39. As shown, these software instructions include, among other things, an operating system 41, a communications control module 43, an RRC module 44, a NAS module 45, and a usage type association module 49.

The communications control module 43 controls the communication between the mobile device 3 and the base station 5. The communications control module 43 also controls the separate flows of control data and user data (for uplink and downlink) that are to be transmitted to the base station 5 and other nodes (via the base station 5) such as the MME 9 and/or the S-GW 18.

The RRC module 44 is operable to generate, send and receive signalling messages formatted according to the RRC standard. For example, such messages are exchanged between the mobile device 3 and its serving base station 5. The RRC messages may include, for example, messages relating to the random access procedure and/or the RRC messages comprising control data (e.g. NAS messages) to be relayed by the serving base station 5 to the MME 9.

The NAS module 45 is operable to generate, send and receive signalling messages formatted according to the NAS protocol. For example, such messages are exchanged (via the base stations 5) between the mobile device 3 and the MMEs 9. The NAS messages may include, for example, the NAS messages comprising control data for registering the mobile device 3 with an MME 9.

The usage type association module 49 stores information about the usage type associated with this mobile device 3. For example, the usage type might be stored in the form of a 'UE usage type' parameter. Based on the stored usage type information, the usage type association module 49 assists the RRC module 44 in selecting an appropriate preamble for initiating a random access procedure with a base station 5.

<Base Station>

FIG. 3 is a block diagram illustrating the main components of one of the base stations 5 shown in FIG. 1. As shown, the base station 5 has a transceiver circuit 51 for transmitting signals to and for receiving signals from the mobile devices 3 via one or more antenna 53, a base station interface (X2) 54 for transmitting signals to and for receiving signals from other base stations, and a core network interface (S1) 55 for transmitting signals to and for receiving signals from the core network entities (e.g. the MMEs 9 and the S-GW 18). The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communication network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, an RRC module 65, an S1AP module 67, and an MME availability information storing module 69.

The communications control module 63 controls the communication between the base station 5 and the mobile devices 3 and other network entities (e.g. the MMEs 9) that are connected to the base station 5. The communications control module 63 also controls the separate flows of uplink/downlink user traffic and control data to be transmitted to the mobile devices 3 associated with this base station 5 including, for example, control data for rerouting NAS messages.

The RRC module 65 is operable to generate, send and receive signalling messages formatted according to the RRC standard. For example, such messages are exchanged between the base station 5 and the mobile devices 3 that are associated with this base station 5. The RRC messages may include, for example, the RRC messages comprising control data (e.g. NAS messages) for relaying between the mobile device 3 and its serving MME 9.

The S1AP module 67 is operable to generate, send and receive signalling messages formatted according to the S1 application protocol (S1AP) standard. For example, such messages are exchanged between the base station 5 and the MMEs 9 connected to this base station 5. The S1AP messages may include, for example, messages relating to rerouting of NAS signalling, such as Reroute NAS message requests, Downlink NAS transport messages, S1 setup messages, and associated responses.

The MME availability information storing module 69 stores information about availability of particular MMEs (or MME groups), and any associated usage types. The MME availability information storing module 69 provides this information to other modules, for example, the S1AP module 67 for use in rerouting NAS messages.

<Mobility management entity>

FIG. 4 is a block diagram illustrating the main components of one of the MMEs 9 shown in FIG. 1. As shown, the MME 9 has a transceiver circuit 71, a base station interface (S1) 74 for transmitting signals to and for receiving signals from the base stations 5, and a core network interface 75 for transmitting signals to and for receiving signals from other core network nodes (such as the HSS 11). The MME 9 has a controller 77 to control the operation of the MME 9. The controller 77 is associated with a memory 79.

Software may be pre-installed in the memory 79 and/or may be downloaded via the communication network 1 or from a removable data storage device (RMD), for example. The controller 77 is configured to control the overall operation of the MME 9 by, in this example, program instructions or software instructions stored within memory 79. As shown, these software instructions include, among other things, an operating system 81, a communications control module 83, a non-access stratum (NAS) module 85, an S1AP module 87, and a usage type association module 89.

The communications control module 83 controls the communication between the MME 9 and other network entities that are connected to the MME 9 (e.g. the base stations 5, the HSS 11, and any mobile devices 3 when connected to one of the base stations 5).

The NAS module 85 is operable to generate, send and receive signalling messages formatted according to the NAS protocol. For example, such messages are exchanged (via the base stations 5) between the MME 9 and the mobile devices 3 that are associated with this MME 9. The NAS messages may include, for example, the NAS messages comprising control data for registering a mobile device 3 with the MME 9.

The S1AP module 87 is operable to generate, send and receive signalling messages formatted according to the S1 application protocol (S1AP) standard. For example, such messages are exchanged between the MME 9 and the base stations 5 connected to this MME 9. The S1AP messages may include, for example, messages relating to rerouting of NAS signalling, such as Reroute NAS message requests, Downlink NAS transport messages, S1 setup messages, and associated responses.

The usage type association module 89 stores information about the usage type(s) associated with this MME 9. For example, the usage type might be stored in the form of a 'UE usage type' parameter and/or an MME group identifier (MMEGI).

In the above description, the mobile device 3, the base station 5 and the MME 9 are described for ease of understanding as having a number of discrete modules (such as the communications control modules, the RRC/NAS modules, and the S1AP modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of different exemplary embodiments will now be described that illustrate how different aspects of the invention can be put into effect using the above mobile device 3, base station 5, and MME 9. The exemplary embodiments will be described with reference to the signalling (or 'timing') diagrams shown in FIGS. 5 to 9.

Operation—First Exemplary Embodiment

FIG. 5 illustrates an exemplary timing diagram indicating a procedure for the base station 5 obtaining and using information about a mobile device's 3 service type in selecting an appropriate MME 9 for the mobile device 3.

In this exemplary embodiment, the base station 5 is configured to obtain information about a connected MME's 9 supported service type(s) during an initial setup procedure which configures the S1 connection between the base station 5 and the MME 9.

Specifically, as shown in step S500, the base station 5 obtains (using its S1AP module 65) this information from an appropriately formatted S1 message (such as an 'S1 setup response' message or an 'MME configuration update' message) received from the MME 9. The contents of these messages are shown in Tables 1 and 2 (as example only). As can be seen, in this example, the MME's 9 S1 setup response includes an appropriately formatted information element (IE) which includes configuration parameters associated with the MME 9. The configuration parameters comprise information identifying service type(s) supported by the MME 9. It will be appreciated that the each service type comprises (and/or is mapped to) a corresponding UE usage type and hence a listing of UE usage types for a particular MME determines which service(s)/UE usage type(s) that MME supports as a dedicated MME.

Optionally, the base station 5 may also obtain (using its S1AP module 65) information identifying an availability of the MME 9D, for example, whether or not the MME 9D is overloaded. In the example shown in FIG. 5, the base station 5 receives an appropriately formatted S1 message indicating that the MME 9D is overloaded.

The base station 5 is configured to add an entry for each connected MME 9 to the list of entries stored in its MME availability information storing module 69 with an appropriate indication whether or not that MME is currently available (and potentially including information identifying a reason why a particular MME is unavailable: e.g. not connected, overloaded, etc). For each MME 9, the MME availability information storing module 69 also holds information identifying any associated UE usage types (if available). Thus, upon receipt of the message at step S501, the base station 5 stores information (in its MME availability information storing module 69) that the MME 9D is currently unable to register new mobile devices 3.

Beneficially, in this system the base station 5 is also configured to obtain (e.g. using its RRC module 65) information from each mobile device 3 served by this base station 5 about the respective UE usage type/service type associated with that particular mobile device 3. This indication might be explicit or implicit, as appropriate. Beneficially, the base station 5 is configured to obtain this information before performing any NNSF procedure for the mobile device 3 (i.e. before forwarding any NAS message from the mobile device 3 to an incorrect (or a default) MME 9).

In this example, this is achieved implicitly, by assigning different random access preambles (or set of preambles) to different UE usage groups. The base station 5 is configured to inform, in step S502, the mobile devices 3 in its cell (e.g. via system information broadcast) about the association between respective UE usage type values and corresponding preambles.

Thus, already when the mobile device 3D establishes a radio connection with this base station 5, it is able to inform the base station 5 about its associated UE usage type by selecting (in step S504) and including (in step S505) an appropriate random access preamble in a message relating to the random access procedure.

Therefore, beneficially, by detecting which preamble is used by the mobile device 3 performing a random access procedure (in step S505), the base station 5 is able to determine the mobile device's 3 associated UE usage type even before completing the setting up of a radio connection between the base station 5 and the mobile device 3. Advantageously, the mobile device 3 is able to indicate its UE usage type (implicitly) without requiring any additional signalling towards the base station 5 (and without requiring any signalling with the core network 7).

Beneficially, using the information about the MME's associated service type (UE usage type) and the UE usage type information obtained from the mobile device 3, the base station is able to perform, in step S509, NNSF more efficiently, and select the right MME for a given mobile device (potentially without involving any core network node, such as a default MME). This may in turn also reduce the time it takes for a mobile device to register with an MME.

TABLE 1

S1 setup response message parameters
Direction: MME → eNB

| IE/Group Name | Presence | Range | IE type and reference | Semantics description |
|---|---|---|---|---|
| Message Type | M | | 9.2.1.1 | |
| MME Name | O | | PrintableString (SIZE(1 . . . 150, . . . )) | |
| Served GUMMEIs | | 1 . . . <maxnoofRATs> | | The LTE related pool configuration is included on the first place in the list. |

TABLE 1-continued

S1 setup response message parameters
Direction: MME → eNB

| IE/Group Name | Presence | Range | IE type and reference | Semantics description |
|---|---|---|---|---|
| >Served PLMNs | | 1 . . . <maxnoofPLMNsPerMME> | | |
| >>PLMN Identity | M | | 9.2.3.8 | |
| >Served GroupIDs | | 1 . . . <maxnoofGroupIDs> | | |
| >>MME Group ID | M | | OCTET STRING (SIZE(2)) | |
| >Served MMECs | | 1 . . . <maxnoofMMECs> | | |
| >>MME Code | M | | 9.2.3.12 | |
| Relative MME Capacity | M | | 9.2.3.17 | |
| MME Relay Support Indicator | O | | 9.2.1.82 | |
| Criticality Diagnostics | O | | 9.2.1.21 | |
| Service Type List | | 0 . . . <maxnoofUEUsageType> | | Listing of services supported by the MME |
| >UE Service Type | M | | 9.2.1.x | UE Service Type associated with a specific service supported by the MME |

TABLE 2

MME configuration update message parameters
Direction: MME → eNB

| IE/Group Name | Presence | Range | IE type and reference | Semantics description |
|---|---|---|---|---|
| Message Type | M | | 9.2.1.1 | |
| MME Name | O | | PrintableString (SIZE(1 . . . 150, . . . )) | |
| Served GUMMEIs | | 0 . . . <maxnoofRATs> | | The LTE related pool configuration is included on the first place in the list. |
| >Served PLMNs | | 1 . . . <maxnoofPLMNsPerMME> | | |
| >>PLMN Identity | M | | 9.2.3.8 | |
| >Served GroupIDs | | 1 . . . <maxnoofGroupIDs> | | |
| >>MME GroupID | M | | OCTET STRING (SIZE(2)) | |
| >Served MMECs | | 1 . . . <maxnoofMMECs> | | |
| >>MME Code | M | | 9.2.3.12 | |
| Relative MME Capacity | O | | 9.2.3.17 | |
| Service Type List | | 0 . . . <maxnoofUEUsageType> | | Listing of services supported by the MME |
| >UE Service Type | M | | 9.2.1.x | UE Service Type associated with a specific service supported by the MME |

Operation—Second Exemplary Embodiment

FIGS. 6 and 7 illustrate exemplary timing diagrams indicating procedures for the base station 5 obtaining and using information about a connected MME's 9 supported service type(s) during a NAS rerouting procedure.

It is assumed that the base station 5 has been set up with each MME 9 by creating respective S1 connections with each MME 9. The base station 5 is configured to add an entry for each connected MME 9 to the list of entries stored in its MME availability information storing module 69 with an appropriate indication whether or not that MME is currently available (and potentially including information identifying a reason why a particular MME is unavailable: e.g. not connected, overloaded, etc). For each MME 9, the MME availability information storing module 69 also holds information identifying any supported service type(s) that correspond to UE usage types (if available). It will be appreciated that the supported service type(s) (along with any further MME specific information shown in Tables 1 and 2) might be obtained from each connected MME as described above in the first exemplary embodiment.

As shown generally in step S600, the MME 9D is initially in an overload, thus it is currently unable to register new mobile devices. However, the mobile device 3D shown in FIG. 6 has an associated usage type that corresponds to the usage type supported by this MME 9D.

The procedure begins with the mobile device 3D generating and sending, in step S601, a NAS message to its serving base station 5 (for relaying the NAS message to an appropriate dedicated MME). The NAS message may comprise an attach request, a tracking area update (TAU), a location area update (LAU), and/or the like. The mobile device 3D embeds this NAS message in a suitable RRC message and sends this RRC message to the serving base station 5 (after performing an appropriate random access procedure, if necessary). In step S602, the base station 5 takes the NAS message from the received RRC message, and embeds it in an appropriately formatted S message before sending it to the default MME 9A.

In response to this, the default MME 9A attempts to obtain a UE context associated with the mobile device 3D from the mobile device's 3D previous serving MME 9C (which is indicated in the received NAS message, e.g. in the form of an associated GUTI and/or GUMMEI). In order to do so, the MME 9A generates and sends, in step S604, an appropriately formatted context request message to the old MME 9C. The old MME 9C responds by generating and sending, in step S606, an appropriately formatted context request response to the default MME 9A, and includes in this message the UE context and information identifying the UE usage type associated with this mobile device 3D (originally obtained from the HSS 11).

Based on the UE usage type included in the context response message (at step S606), the default MME 9A decides to move the handling of the mobile device's 3D message to another MME (i.e. one that is associated with this UE usage type). Therefore, the default MME 9A proceeds to step S610.

However, in the meantime, following the overload in step S600, the MME 9D generates (using its S1AP module 87) and sends, in step S608, and appropriate overload indication message to the base station 5 (although it may also send such indication to all base stations and/or other MMEs as well). Upon receipt of this message, the base station 5 updates the entry held for this MME 9D in its MME availability information storing module 69 with information that the MME 9D is unavailable due to an overload. Even though step S608 is shown as taking place following the attach/TAU request and context request/context response messages, the overload indication is independent from steps S601 to S606. Therefore, it will be appreciated that step S608 may take place any time following step S600 (e.g. even prior to step S601).

In step S610, the default MME 9A generates (using its S1AP module 87) and sends an appropriately formatted S1 signalling message to the base station 5, requesting the base station 5 to reroute the NAS message sent by the mobile device 3D. As shown in FIG. 6, this Reroute NAS message request includes: the original (unmodified) NAS message from the mobile device 3D; information identifying a reroute parameter (e.g. an MME group identifier ('MMEGI') to which the NAS message needs to be rerouted); a globally unique temporary identifier ('GUTI') associated with the mobile device 3D; information identifying the sending MME 9A (e.g. by a globally unique MME identifier—'GUMMEI'); and/or information identifying the service type associated with the mobile device 3D (e.g. a UE usage type indicated in the UE context response received at S606).

In this example, the UE usage type associated with the mobile device 3D is supported by the dedicated MME 9D (that belongs to the group identified by the MMEGI in S610). However, the MME 9D is currently experiencing overload (and it has already notified the base station 5 about the overload situation in step S608).

Therefore, the base station 5 generates (using its S1AP module 67) and sends, in step S612, an appropriately formatted S1 response to the default MME 9A, indicating that the NAS message sent by the mobile device 3D cannot be rerouted. The base station 5 also includes in this message (e.g. a 'Reroute NAS message failure' message) information identifying a cause why the NAS message sent by the mobile device 3D cannot be rerouted. In this case, the base station 5 indicates that the dedicated MME 9D is overloaded. Moreover, by including the same MMEGI that was received in step S610, the base station 5 is able to request the default MME 9A not to reroute the NAS message again (at least until the dedicated MME 9D remains overloaded).

Beneficially, since the default MME 9A stored the UE context received in step S606, it is therefore able to attempt registering and serving the mobile device 3D. If the default MME 9A is able to register the mobile device 3D, then it proceeds to generate and send, in step S616, an appropriate signalling message confirming to the base station 5 that the mobile device 3D has been successfully registered with this MME 9A. The base station 5 informs the mobile device 3D about the selected serving MME 9A (in step S617) and confirms receipt of the MME's 9A message (in step S618).

FIG. 7 illustrates a scenario in which the dedicated MME 9D is no longer overloaded.

As generally shown in step S700, the mobile device 3D initiates the procedure by sending an appropriately formatted RRC message to the base station 5 (e.g. an RRC message including an initial UE message for forwarding to an appropriate MME 9). The mobile device's 3D message includes the NAS message which is to be forwarded to the MME 9 and the GUTI associated with the mobile device 3D (identifying the sender of the NAS message).

Steps S702 to S706 correspond to steps S602 to S606, respectively, thus their description is omitted here for simplicity.

However, in this case the associated dedicated MME 9D (that belongs to the group MMEGI in S710) is available (according to the information held in the MME availability information storing module 69 of the base station 5). Therefore, when the default MME 9A generates and sends, in step S710, an appropriate S1 request to initiate rerouting of the mobile device's 3D NAS message to a dedicated MME within the group identified by the MMEGI in the message, the serving base station 5 is able to comply with this request.

Thus, the base station 5 generates (using its S1AP module 67) and sends, in step S715, and appropriately formatted S1 signalling message to the dedicated MME 9D. The base station 5 includes in this S1 message the NAS message (initial UE message) from the mobile device 3D and the GUTI for the mobile device 3D.

If the dedicated MME 9D is able to register the mobile device 3D, then it proceeds to generate and send, in step S716, an appropriate signalling message confirming to the base station 5 that the mobile device 3D has been successfully registered with this MME 9D. The base station 5 informs the mobile device 3D about the selected serving MME 9D (in step S717) and confirms to the MME 9D that the attach procedure is complete (in step S718).

In step S722, the base station 5 confirms to the default MME 9A that the NAS message has been successfully redirected, by generating and sending an appropriate S1 message (e.g. a 'Reroute NAS message response' message). The base station 5 also includes in this message parameters (e.g. an associated S-TMSI, and an 'eNB UE S1AP ID') associated with the UE context for the mobile device 3D.

Based on the confirmation that NAS rerouting was successful, and based on the parameters associated with the UE context for the mobile device 3D, the default MME 9A proceeds to delete, in step S724, any UE context stored for this mobile device 3D in its memory 79.

Beneficially, the default MME 9A does not need to store unnecessary UE context in the case when NAS message rerouting is possible (i.e. when the dedicated MME 9D is not in overload). However, the default MME 9A only deletes stored UE context, upon receiving confirmation (in step S722) from the base station 5, rather than upon sending the Reroute NAS message request (at step S710). In other words, the default MME 9A treats the Reroute NAS message request as a procedure that requires a positive confirmation before it is deemed successful (i.e. the MME does not automatically deem this procedure to be successful).

Operation—Third Exemplary Embodiment

FIGS. 8 and 9 illustrate exemplary timing diagrams indicating procedures for the base station 5 obtaining and using information about a connected MME's 9 supported service type(s) using a downlink NAS transport message (or another suitable S1AP message).

FIG. 8 generally corresponds to FIG. 6, and FIG. 9 generally corresponds to FIG. 7, although some of the messages are omitted for clarity. The main difference is that in FIGS. 8 and 9 a so-called 'Downlink NAS transport' request (in steps S810 and S910) and a corresponding 'Downlink NAS transport failure' (in step S812) or 'Downlink NAS transport response' (in step S922) are used instead of a 'Reroute NAS message request', (in steps S610 and S710), a 'Reroute NAS message failure' (in step S612) or 'Reroute NAS message response' (step S722), respectively.

A benefit associated with this solution is that an MME sending a 'Reroute NAS message request' does not currently expect any response to this message (in accordance with current LTE standards). Therefore, some MMEs (e.g. MMEs that implement an earlier release of the LTE standards) may not be able to comply with the base station request (at step S612) to register the mobile device 3D that would otherwise need to be registered with the dedicated MME 9D.

However, the 'Downlink NAS transport' request used in FIGS. 8 and 9 always require a response (success or failure) thus MMEs are more likely to be able to understand the base stations response for this message (and/or any parameters included therein).

Modifications and Alternatives

Detailed exemplary embodiments have been described above. As those skilled in the art will appreciate, a number of modifications and alternatives can be made to the above exemplary embodiments whilst still benefiting from the inventions embodied therein. By way of illustration only a number of these alternatives and modifications will now be described.

In the above exemplary embodiments, the mobile devices are cellular telephones. It will be appreciated that the above exemplary embodiments could be implemented using devices other than mobile telephones such as, for example, personal digital assistants, laptop computers, web browsers, etc. The above exemplary embodiments are applicable to non-mobile or generally stationary user equipment as well.

The above exemplary embodiments have been described using an MME for illustrative purposes only and in no way shall be considered limiting the invention to require an MME and/or a LTE core network. For example, an SGSN may be used instead of an MME. In this case, an appropriate SGSN group identifier may be used instead of the MMEGI described in steps S610/S710/S810/S910 above. Exemplary embodiments of the invention are applicable to systems according to other (3GPP and/or non-3GPP) standards as well in which user equipment is required to connect to dedicated network nodes.

In the above description, the MME deletes stored UE context upon receiving confirmation from the base station that the requested rerouting of the NAS message was successful. It will be appreciated that such procedures that require an explicit confirmation (success/failure) are often referred to as Class 1 procedures in LTE. Contrastingly, procedures that do not require any confirmation are deemed to be successful automatically. Such procedures are referred to as Class 2 procedures in LTE. Beneficially, the above exemplary embodiments use Class 1 procedures so that the base station is able to respond to the requesting MME whether or not rerouting of a NAS message is possible (and indicate a reason if not possible).

In the above description of the first exemplary embodiment, the mobile device is configured to indicate, implicitly, its associated service type/UE usage type by selecting and transmitting an appropriate random access preamble to the base station. However, it will be appreciated that the mobile device may also provide this information to the base station using appropriately configured low access priority indication (LAPI) signalling. Moreover, the mobile device may be configured to indicate its associated UE usage type (explicitly) in its initial Attach Request message sent to the base station (e.g. in step S507). The mobile device may also be configured to indicate its associated UE usage type in a signalling message when requesting RRC connection establishment (e.g. using an 'RRCConnectionRequest' message), for example, by including an appropriately formatted establishment cause in the signalling message. For example, the mobile device might adapt the existing 'delayTolerantAccess-v 1020' establishment cause to indicate its associated UE usage type or use any other (new) establishment cause suitable for indicating a specific UE usage type.

In the above exemplary embodiments, the serving base station is described to select the default MME in case of an overload of the dedicated MME. However, it will be appreciated that the base station may also select a different MME (e.g. a common MME) instead of the default MME, depending on operator configuration. Such selection configuration may be applied per UE usage type/MMEGI/MME etc. If the base station is configured to select a different MME to the default MME, then it might generate and send and appropriate S1 message to the selected MME (instead or responding to the default MME as in step S612 or S812), and include in this message the mobile device's NAS message and information identifying the reason why the dedicated MME cannot be used (e.g. the information included in message S612).

It will be appreciated that the above exemplary embodiments may also be applied to heterogeneous/partial DCN deployments, when a DCN is deployed only some RATs (but not all) and/or only for a specific area within the network. In this case, the base station and the MME may be configured to take into account whether the UE is inside or outside the specific service area or RAT that supports the DCN.

In the above exemplary embodiments, a number of software modules were described. As those skilled in the art will appreciate, the software modules may be provided in compiled or un-compiled form and may be supplied to the base station or the MME as a signal over a computer network, or on a recording medium. Further, the functionality performed by part or all of this software may be performed using one or more dedicated hardware circuits. However, the use of software modules is preferred as it facilitates the updating of the base station, the MME, and the mobile device in order to update their functionalities.

The transceiver of the communication apparatus may be operable to receive, from said dedicated MME, information identifying a communication loading for said dedicated MME, and wherein said controller is operable to determine, based on said information identifying a communication loading for said dedicated MME, whether or not said dedicated MME is suitable for serving said communication device that sent said signalling for establishing a communication connection. In this case, the transceiver of the communication apparatus may be operable to receive, from said dedicated MME, information identifying a service type that said information identifying a communication loading for said dedicated MME relates to.

The transceiver of the communication apparatus may be operable to receive, from said dedicated MME, an MME overload message including said information identifying a service type that said information identifying a communication loading for said dedicated MME relates to.

The message identifying a dedicated MME may comprise at least one of: a Reroute NAS message request; and a Downlink NAS transport request. The response to said default MME may comprise at least one of: a Reroute NAS message failure; and a Downlink NAS transport failure. The response to said default MME may include information identifying a cause for said re-routing to said dedicated MME being unsuccessful (e.g. due to a loading of said dedicated MME).

The transceiver of the communication apparatus may operable to receive, from at least one communication device within said communication cell, signalling for establishing a communication connection via said communication apparatus, wherein said signalling for establishing a communication connection comprises information identifying a usage type associated with said at least one communication device. In this case, the controller of the communication apparatus may be operable to identify, based on said information identifying a usage type and said respective information identifying said at least one supported service type, at least one MME that supports communication devices having a usage type corresponding to at least one service type supported by that MME.

The controller (of the communication apparatus) may be operable to route said communication connection to said at least one MME that supports communication devices having a usage type corresponding to at least one service type supported by that MME.

The transceiver (of the communication apparatus) may be operable to receive said information identifying a group associated with a particular MME and said information identifying said at least one supported service type of that particular MME using at least one of: an S1 setup response message; and an MME configuration update message.

The information identifying said at least one supported service type of a particular MME may comprise at least information element (e.g. a 'service type list' information element, a 'UE service type' information element, and/or a 'UE usage type' information element).

The transceiver (of the communication apparatus) may be operable to receive information identifying a communication loading for said at least one MME.

The information identifying the usage type associated with said communication device may comprise a low access priority indication (LAPI) and/or a connection establishment cause (e.g. in an 'RRCConnectionRequest' message).

The information identifying said usage type associated with said communication device may comprise a random access preamble associated with that usage type. The communication apparatus may be operable to transmit (e.g. via system broadcast), within said communication cell, information identifying at least one supported service type and a respective set of random access preambles associated with that at least one supported service type. In this case, the transceiver (of the communication device) may be operable to receive (e.g. via system broadcast), from said communication apparatus, information identifying at least one supported service type and a respective set of random access preambles associated with that at least one supported service type, and wherein said controller is operable to select a preamble for transmission, by said transceiver, based on said received information identifying at least one supported service type and a respective set of random access preambles associated with that at least one supported service type.

The MME may further comprise: a memory configured to store a UE context associated with said communication device having an associated usage type; and a processor operable to control said memory such that: (a) said UE context associated with said communication device having an associated usage type is maintained in said memory when said response indicates that re-routing to said dedicated MME is unsuccessful; and (b) said UE context associated with said communication device having an associated usage type is not maintained in said memory when said response indicates that re-routing to said dedicated MME is successful.

Various other modifications will be apparent to those skilled in the art and will not be described in further detail here.

The invention claimed is:

1. A method performed by a base station providing communication access to a communication network, the method comprising:
   receiving, from a core network (CN) node, information identifying a group associated with the CN node, information identifying at least one service type supported by the CN node, and information indicating the CN node is unavailable if the CN node is unavailable; and
   receiving a Random Access Preamble message including a random access preamble associated with a usage type from a communication device.

2. A method performed by a communication device, the method comprising:
   sending, a Random Access Preamble message to a base station,
   wherein the Random Access Preamble message includes a random access preamble associated with a usage type, and
   wherein the method further comprises:
   receiving, from the base station, information identifying association between respective random access preambles and at least one corresponding usage type; and selecting a random access preamble associated with a usage type for transmission, based on the information identifying association between the respective random access preambles and the at least one corresponding usage type.

3. A method performed by a core network (CN) node configured to operate as a dedicated CN node, the method comprising:
sending, to a base station, information identifying a group associated with the CN node, information identifying at least one service type supported by the CN node and information indicating the CN node is unavailable if the CN node is unavailable.

* * * * *